United States Patent

Villata et al.

[11] Patent Number: 6,059,662
[45] Date of Patent: *May 9, 2000

[54] TORSION PREDAMPING DEVICE

[75] Inventors: Gino Villata, Buttigliera D'Asti, Italy; Nicolas Phelps, Paris, France

[73] Assignee: Valeo, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/652,490
[22] PCT Filed: Sep. 29, 1995
[86] PCT No.: PCT/FR95/01269
  § 371 Date: Jun. 18, 1996
  § 102(e) Date: Jun. 18, 1996
[87] PCT Pub. No.: WO96/10138
  PCT Pub. Date: Apr. 4, 1996

[30] Foreign Application Priority Data

Sep. 29, 1994 [FR] France ................................. 94 11642

[51] Int. Cl.[7] ..................................................... F16D 3/04
[52] U.S. Cl. ........................... 464/101; 464/74; 464/75; 192/213.1; 192/209
[58] Field of Search ................................. 464/66, 68, 67, 464/63, 73, 74, 75, 100, 101; 192/209, 55.3, 213.2

[56] References Cited

U.S. PATENT DOCUMENTS

| | | |
|---|---|---|
| 1,946,956 | 2/1934 | Wasiege . |
| 1,968,188 | 6/1934 | Wood ...................................... 464/74 X |
| 2,088,979 | 8/1937 | Stanley ...................................... 192/209 |
| 2,737,033 | 3/1956 | Bendall ...................................... 464/75 |
| 2,775,105 | 12/1956 | Banker ...................................... 464/101 |
| 3,257,860 | 6/1966 | Runde et al. ........................ 464/75 X |
| 3,321,935 | 5/1967 | Wildhaber ................................ 464/75 |
| 3,540,233 | 11/1970 | Pearson ...................................... 464/74 |
| 4,185,728 | 1/1980 | Gatewood ............................ 192/213.1 |
| 4,373,925 | 2/1983 | Fickelscher ........................... 464/74 X |
| 4,470,494 | 9/1984 | Takeuchi ............................. 464/101 X |
| 4,634,397 | 1/1987 | Beccaris et al. .................... 192/209 X |
| 4,637,500 | 1/1987 | Gobel et al. ................... 192/213.12 X |
| 4,698,045 | 10/1987 | Billet et al. .................... 192/213.12 X |
| 4,714,448 | 12/1987 | Focqueur et al. .................. 192/209 X |
| 4,883,156 | 11/1989 | Rohrle et al. ................. 192/213.21 X |
| 5,168,971 | 12/1992 | Kovac ............................ 192/213.21 X |

FOREIGN PATENT DOCUMENTS

| | | |
|---|---|---|
| 2496210 | of 0000 | France . |
| 2517006 | 5/1983 | France . |
| 3322412 | 1/1985 | Germany . |
| 84 25598 | 1/1986 | Germany . |
| 5-157119 | 6/1993 | Japan ........................................ 464/74 |
| 2169988 | 7/1986 | United Kingdom . |

*Primary Examiner*—Lynne H. Browne
*Assistant Examiner*—Greg Binda
*Attorney, Agent, or Firm*—Liniak, Bernato Longarce & White

[57] ABSTRACT

A torsional pre-damping device for damping the impact between a hub and a hub disc. A crown insert (20) made of absorbent material is arranged between the engaging teeth (18) and the engaged teeth (19) of the loose meshing portions (16) defined between the disc and the hub.

5 Claims, 1 Drawing Sheet

TORSION PREDAMPING DEVICE

BACKGROUND OF THE INVENTION a) Field of the Invention

The present invention relates to a torsion predamping device comprising at least two coaxial parts, mounted rotationally in relation to one another within the limits of a determined angular clearance and associated with resilient predamping and centring means.

The present invention more particularly relates to an improvement to a predamping sub-assembly intended to dampen the impact of the shock between a hub and a hub disc at the end of their angular clearance.

b) Description of Related Art

In a known torsion damping device, one of the rotational parts bears a driven plate assembly intended to be rotationally connected with a first shaft, in practice a driving shaft, the crankshaft of the internal combustion engine in the case of an application to a motor vehicle, whereas another of the rotational part comprises a hub by which it is intended to be rotationally connected with a second shaft, in practice a driven shaft, the primary shaft of a gearbox in the case concerned of such a motor vehicle.

In such an assembly, from document FR-A-2 496 210 it is known for example to add a torsion predamping sub-assembly in which the delimitation of the angular clearance between the two coaxial parts is provided by loose meshing means provided with small studs, made of elastomer, placed on the loose meshing teeth of one of the coaxial parts, against which the loose meshing elements of the other coaxial part come to abut in order to reduce the noise of impact at the end of travel of the loose meshing means.

However this solution does have drawbacks. On account of their reduced size, the studs indeed only provide localised damping, resulting in a residual noise which can not be eliminated. Moreover, the service life of these elastomeric elements is limited and they weaken the teeth on which they are placed.

SUMMARY OF THE INVENTION

To reduce these difficulties, the present invention proposes a new torsion predamping device, especially for a motor vehicle clutch, comprising two coaxial parts with loose meshing means between them and mounted rotationally in relation to one another in opposition to resilient means called predamping and centring means, characterised in that the meshing means comprise engaging teeth and engaged teeth and a crown insert made of material absorbing the shocks is disposed between the teeth.

All the moment of torsion is transmitted by means of the crown insert. The latter is relatively cheap to manufacture and is simple to put in place.

Furthermore, the loose meshing means (the engaging and engaged teeth) are not weakened, in contrast to those in document FR-A-2 496 210.

BRIEF DESCRIPTION OF THE DRAWINGS

Other characteristics and advantages of the invention will moreover become apparent from the following description, by way of example, with reference to the drawings on which.

DETAILED DESCRIPTION OF PREFERRED EMBODIMENTS

Figure 1:
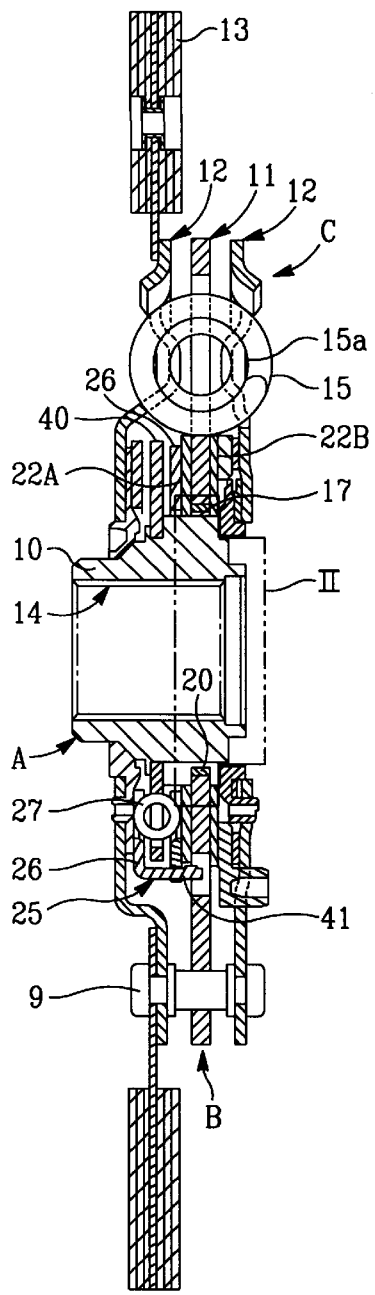
FIG. 1 is a sectional view of a clutch friction with a predamping device according to the invention.

These figures illustrate by way of example the application of the invention to a torsion damping device, which, intended to form a clutch friction for a motor vehicle clutch, comprises, successively rotatingly mounted two by two in relation to one another, three coaxial parts, i.e. a part A, essentially formed by a hub 10, a part B, essentially formed by a hub disc 11, which surrounds the hub 10, and a part C, essentially formed by two guide washers 12, disposed on either side of the hub disc 11 and surrounding the hub 10, connected to one another by small posts 9 and therefore actuated by the same rotational movement.

The coaxial part C bears a driven plate assembly 13, the friction linings of which are intended, in a known manner, to be clamped between two plates rotationally connected to a driving shaft, the third motion shaft at the crankshaft of the engine in the case of a motor vehicle.

The hub 10 itself has internal splines 14, intended to connect it for rotation to a driven shaft, the primary shaft of associated the gear box in the case of such a motor vehicle.

The coaxial parts B and C are rotationally mounted in relation to one another, in opposition to resilient means interposed circumferentially between them, formed, in the represented embodiment, by springs 15 and 15a of the coil spring type mounted, in a known manner, in openings made facing one another in the guide washers 12 and in the hub disc 11. The assembly thus formed-by the coaxial parts B, C and the springs 15, 15a forms the main damping device for the clutch friction. Its operation, well known in its own right, will not be described in further detail and is not dependent on the present invention.

The coaxial parts A and B are also mounted rotationally in relation to one another, in opposition to resilient predamping and centring means, within the limits of an angular clearance determined by loose meshing means 16 defined between the disc 11 and the hub 10.

In practice, on its outer periphery, on a longitudinal portion 17 of its outer face, the hub 10 has radial projections 18 forming engaging teeth. On its inner periphery, opposite the portion 17 of the hub 10, the hub disc 11 itself has slots 19, having an angular opening larger than that of the teeth 18, thus forming engaged teeth. A tooth 18 is engaged in each slot 19, the possible angular clearance between the coaxial parts A and B thus being limited by the teeth 18 of the hub 10 coming to abet with the corresponding sides of the slots 19 of the disc 11. The teeth 18 and slots 19 thus form the above-mentioned loose meshing means 16 and have an overall trapezoidal shape.

The device is completed by a predamping sub-assembly comprising in particular a predamping cassette of known type, disposed between the hub 10 and the hub disc 11 within the limits of their angular clearance, determined by loose meshing means 16. This cassette is situated in a plane offset in relation to that of the hub disc 11, in the axial direction. It is mounted axially between the disc 11 and one of the guide washers 12. It is formed by a secondary disc 40 fixed, here by clinching, with the hub 10, placed between flanges 26, themselves rotationally connected to the hub disc 11 by fingers 41. The fingers 41 are engaged in holes of the hub disc 11, with the result that the flanges 26, 26' are rotationally driven with the hub disc 11. Circumferentially acting springs 27 are connected between the flanges 26, 26' on the one hand, and the secondary disc 40 on the other hand, in accordance with a conventional arrangement, the flanges 26, 26' and the disc 40 having facing one another holes for housing the springs 27.

Figure 3:
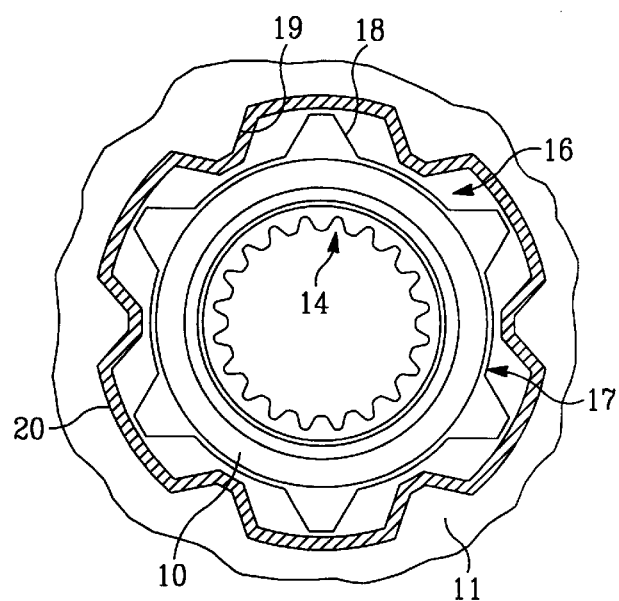
FIG. 3 is a sectional view of FIG. 2, along line III—III.
Figure 2:
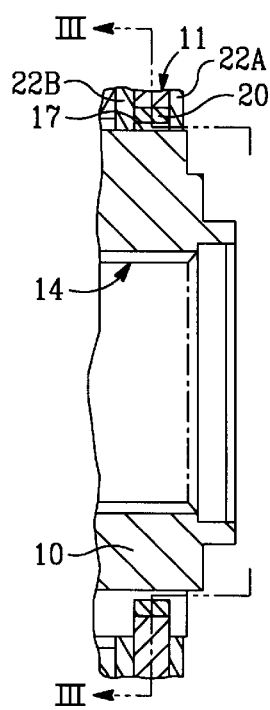
FIG. 2 is a detailed view of the box of FIG. 1 on a larger scale.

The springs 27 are resiliently biased by a relative rotation of the hub disc 11 and of the hub 10 and therefore act in opposition to such a rotation, tending to bring the hub and the disc back into an intermediate position of their angular clearance (see FIG. 3). A friction washer 22A may be sandwiched between the predamping cassette and the hub disc 11. The operation of such a predamping cassette is known.

As a reminder, it will be recalled that the springs 27 are less stiff than the springs 15, 15a. In a first phase, the springs 27 are compressed, the guide washers 12 and the hub disc 11 forming an assembly by means of stiffer springs 15, 15a, this movement continuing until the clearance of the loose meshing means 16 has been removed. Afterwards, the springs 27 remain stretched and a relative movement is produced between the discs 11 and the guide washers 12 with the intervention of the springs 15, 15a.

It will be noted that the fingers 41 are derived from one of the flanges 26 and each passes through a slot made on the outer periphery of the other flange 26'.

Each finger 41 has a spherical deformation at its end for mounting by clipping the flange 26 having fingers 41 on the other flange 26, both flanges being metallic, after mounting the secondary disc 40 and the springs 27.

According to an important characteristic of the invention, the predamping sub-assembly also comprises an insert, in the form of a crown, made of shock-absorbent material, placed between the engaging teeth of the hub 10 and the engaged teeth of the hub disc 11.

According to a first embodiment, represented on FIG. 3, the insert is made of shock-absorbent or noise-limiting material, for example of plastics, lead, cast iron or aluminium, and has better damping properties than steel. It may then assume the shape of the engaging teeth, or according to a preferred embodiment, the engaged teeth. When the insert 20 is placed against the teeth of the hub disc 11, it is laid flat and retained thereagainst by centrifugal force.

Excessive thicknesses may be provided on the contact faces of the insert 20 with the teeth in order to increase the absorbent capacity of the insert.

Figure 4:
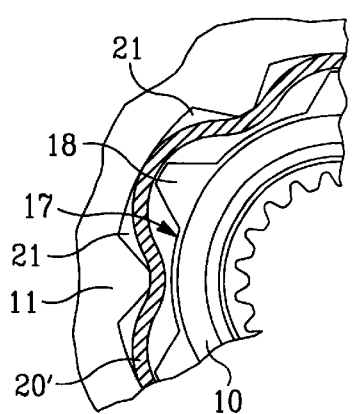
FIG. 4 is a similar view to that of FIG. 3 according to another embodiment of the invention.

According to a second embodiment, represented on FIG. 4, the absorbent property of the insert 20' is essentially bestowed thereupon by its conformation. Spaces 21 are provided between the insert 20' and the contact faces of the engaging and engaged teeth, with the result that the insert does not totally cover any of the two sets of teeth.

Before reaching the end of travel, the teeth 18 come to crush the insert 20' towards the sides of the slots 19, reducing the spaces 21. The impact of the teeth 18 at the end of travel against the slots 19 is thus damped.

In all cases, the positioning of the insert will be facilitated if it is slit.

To avoid a displacement of the insert 20 along the axis around which the hub 10 and the hub disc 11 are situated, friction washers 22A and 22B, coaxial to the disc 11, may be advantageously disposed on either side of the insert 20. This insert is therefore retained axially between these two washers.

According to a particular embodiment, the insert 20 may be attached to one of the friction washers, regardless of whether it is stuck onto this washer, or whether it is moulded.

As a variant, the predamping device may directly act between the disc 11 and the hub 10 as described in the above-mentioned document FR-A-2 496 210.

Of course, the insert may cover the engaging teeth. It may be stuck or moulded onto the hub 10 or the disc.

The insert may have a variable thickness and have for example a greater thickness at the level of its active shock-absorbing zones and lesser thickness at the level of its inactive zones.

On their inner periphery the friction washers 22A and 22B may have engaged teeth to mesh with the engaging teeth of the hub 10 with less clearance than that provided between the engaging teeth of the hub 10 and the engaged teeth of the hub disc 11.

This contributes towards braking the movement between the parts B and A at the end of the travel, the washers 22A, 22B being subject to the action of a Belleville washer 1 bearing on the guide washer 12 not associated with the driven plate assembly 13 for action on a distribution washer 2 connected rotationally by pins to the washer 12 (FIG. 1) and clamping of the washers 22A and 22B with the contact of the disc 11 and of the predamping cassette between the disc 11 and the other washer 12.

Of course, just one of the friction washer 22A, 22B may loosely mesh with the hub 10, the other being for example integral with the distribution washer 2. The washers 22A, 22B may mesh with different clearances with the hub 10, and even without any clearance. All combinations are possible.

We claim:

1. A torsion predamping device comprising first and second coaxial parts (10, 11) with loose meshing means (16) between said coaxial parts rotatingly in relation to one another in opposition to resilient predamping means wherein said first coaxial part comprises a hub (10) having engaging teeth (18) on an outer periphery thereof, while said second coaxial part comprises a hub disc (11) surrounding the hub (10), said hub disc (11) having engaged teeth (19) on an inner periphery thereof, engaged teeth (19), wherein said meshing means comprise said engaging teeth (18), said engaged teeth (19) and a crown insert (20) made of shock-absorbent material radially disposed between said engaging and engaged teeth, and wherein the resilient predamping means are housed in a predamping cassette disposed between the hub (10) and the hub disc (11), said predamping cassette being disposed in a first plane offset in relation to a second plane of said hub disc (11) said crown insert comprising a single piece member substantially circumscribing a common axis of said coaxial parts and being axially disposed and retained between two friction washers (22A, 22B) coaxial with said hub (10).

2. A device according to claim 1, characterised in that the insert (20) is integral with one of the adjacent friction washers (22A, 22B).

3. A device according to claim 1, wherein the insert is moulded to one of the hub and the hub disc.

4. A device according to claim 1, wherein the insert (20) is moulded to one of the friction washers.

5. The torsion predamping device according to claim 1, wherein said crown insert (20) is placed against the engaged teeth of said hub disc (11) so as to be laid flat and retained thereagainst by centrifugal force thereby substantially assuming a shape of the engaged teeth.

* * * * *